United States Patent Office 3,572,158
Patented Mar. 23, 1971

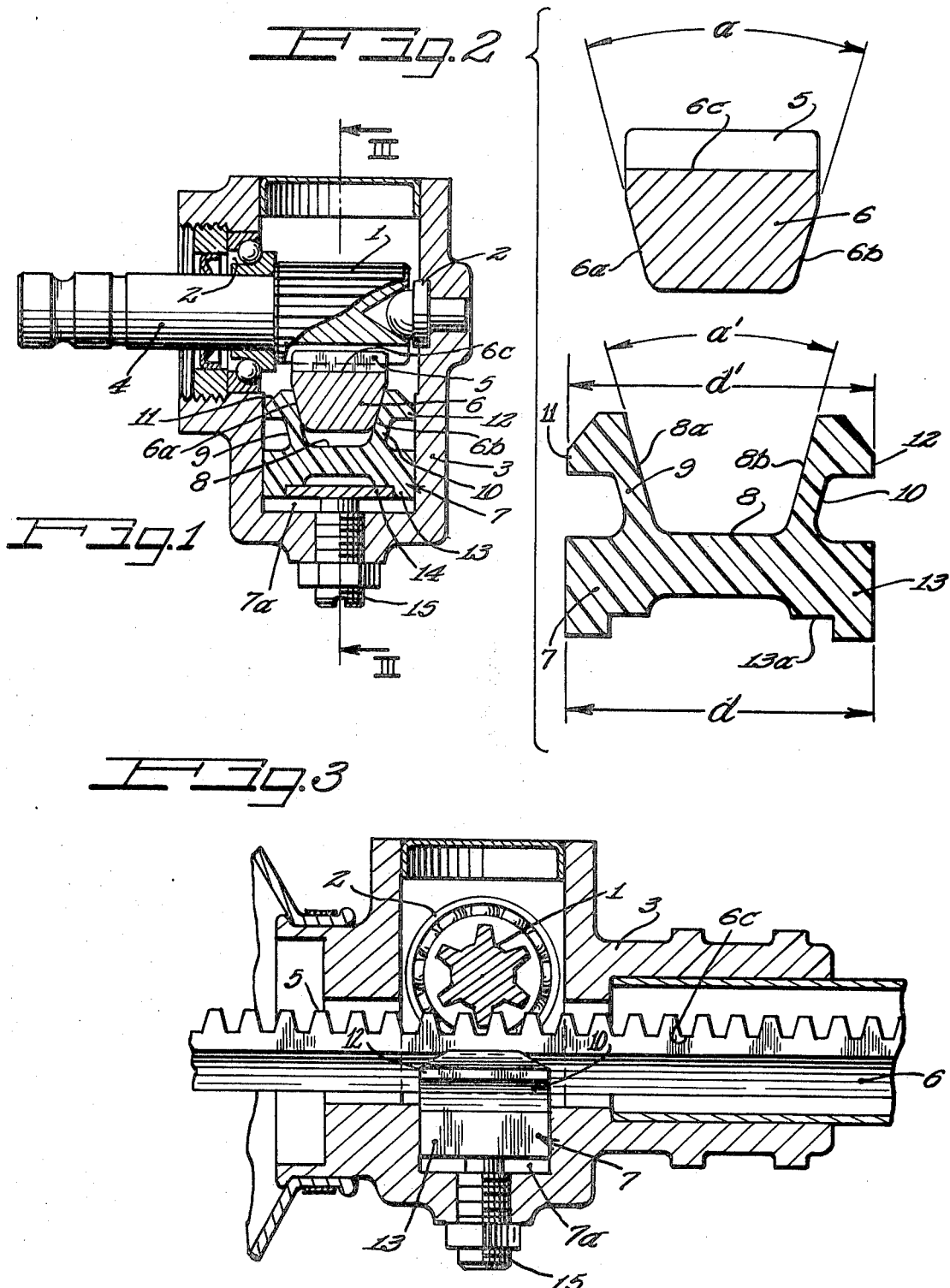

3,572,158
RESILIENTLY DEFORMABLE RACK BAR SUPPORT FOR RACK AND PINION ASSEMBLY
Frederick J. Adams, Campton, near Shefford, England, assignor to Cam Gears Limited, Hitchin, England
Filed July 8, 1969, Ser. No. 839,957
Claims priority, application Great Britain, Aug. 30, 1968, 41,436/68
Int. Cl. B62d 1/20
U.S. Cl. 74—498
5 Claims

ABSTRACT OF THE DISCLOSURE

A rack and pinion assembly for automotive steering gear having a carrier providing an interference fit slidable support for the rack bar holding the rack teeth in meshed engagement with the pinion teeth and preventing lateral displacement of the bar. The bar preferably has a wedge-shaped transverse cross-section, and the carrier preferably has a wedge-shaped recess receiving the rack bar. The carrier is adjustably mounted in the assembly housing to force the rack bar deeper into the recess, and sidewall portions of the carrier are caused to be displaced and compressed between the rack bar and the housing, providing support of the rack bar against transverse movement in the general direction of the pinion axis.

BACKGROUND OF THE INVENTION

Field of the invention

This invention relates to the art of rack and pinion assemblies, especially for automotive steering gear, and particularly deals with a resilient or semi-rigid rack bar carrier maintaining the rack and pinion in engagement and straddling the rack bar to provide support against lateral displacement thereof.

Description of the prior art

Back-up supports for rack bars or rack and pinion assemblies in the form of anti-friction rollers and the like are known in the art as, for example, in my U.S. Letters Pat. 3,421,387 granted Jan. 14, 1969. In my prior U.S. patent, however, a rigid carrier member supported a rigid roller member to provide a relatively expensive, multiple-part assembly having only line contact engagement with the rack bar. A spring support for the carrier member was required to urge the roller against the rack bar.

SUMMARY OF THE INVENTION

The present invention now replaces the expensive, multiple-part, spring-urged rack bar carrier of the prior art with a simple, inexpensive, one-piece carrier providing extended surface support for the rack bar. The one-piece carrier is resilient or semi-rigid, has an interference fit with the rack bar, and is deformed by the rack bar into tight-fitting engagement with the housing so as to be compressed therebetween and provide a firm but somewhat resilient slide bearing for the rack bar.

According to the present invention there is provided a rack and pinion assembly of the kind specified in which the rack bar is laterally supported to maintain the rack and pinion in engagement by a carrier member located between the pinion housing and the rack bar on the side thereof remote from the rack; the carrier member having a longitudinally extending recess with which the rack bar slidably engages as an interference fit so that resilient or semi-rigid side parts of the carrier member partly straddle the rack bar; and wherein the carrier member is mounted in the pinion housing to be laterally adjustable towards the rack bar to relatively move the rack bar deeper into the recess so that by said adjustment the side parts of the carrier member are caused to be displaced and compressed between the rack bar and pinion housing to provide support to the rack bar against transverse movement in the general direction of the pinion axis.

Preferably the rack bar is of "wedge" shape in lateral section and the recess in the carrier member is of substantially corresponding lateral section but of slightly smaller dimensions so that, as the rack bar is moved deeper into the recess as an interference fit, the side parts of the carrier member are increasingly compressed between the rack bar and pinion housing.

The carrier member is conveniently made entirely from a resilient or semi-rigid material, preferably a semi-rigid plastic such as nylon, polyurethane, "Delrin" (a Du Pont de Nemours trade name for actal resin derived by polymerization of formaldehyde) and "Arnite" (a trademark of Algemene Kunstzijde Unie N.V. for polyester resins containing the compound polyethylene terephthalate, known in the art as "P.E.T.P.").

By use of a resilient material for the carrier member, or its side parts in addition to supporting the rack bar against transverse movement, the resilience of the material provides a certain amount of self-adjustment irrespective of any adjustment which is made or the position of the carrier member in the pinion housing. The use of a resilient material has the additional advantage that it assists in the damping of shock forces applied to the rack bar (for example, as are encountered by road shocks when the rack and pinion assembly of the present invention is incorporated in a steering gear).

It is then an object of this invention to provide a rack and pinion assembly in which the rack bar is supported in the housing, both to maintain the rack and pinion in engagement, and also to provide support to the rack bar against lateral movement thereof which could otherwise take place in the general axial direction of the pinion.

Another object of this invention is to provide a rack bar support in a rack and pinion assembly which is composed of a one-piece plastic member affording extensive bearing area for the rack bar.

A still further object of this invention is to provide a rack and pinion assembly with an adjustable, semi-rigid, one-piece carrier for the rack bar.

Another bar object of this invention is to provide a rack bar support in a rack and pinion assembly which has an interference fit with the rack bar.

A still further object of this invention is to provide a rack and pinion assembly where the rack bar has a wedge-shaped transverse cross-section and a bearing support for the rack bar has a wedge-shaped recess providing an interference fit with the rack bar.

Another object of this invention is to provide a one-piece, wedge-bearing support for the rack bar of a rack and pinion steering gear which is deformable to be compressed between the housing and the rack bar for maintaining an interference fit with the rack bar.

Other objects, features and advantages of the invention will be apparent from the following description of a certain preferred embodiment of the invention, taken in conjunction with the accompanying drawing, although variations and modifications may be effected without departing from the spirit and scope of the novel concepts of the disclosure.

BRIEF DESCRIPTION OF THE DRAWING

FIG. 1 is a cross-sectional view taken transverse to the longitudinal axis of the rack bar of a rack and pinion assembly constructed according to the present invention;

FIG. 2 is an enlarged, exploded, transverse cross-sectional view through the rack bar and carrier member incorporated in the assembly of FIG. 1;

FIG. 3 is a longitudinal section of the assembly of FIG. 1 taken along the line III—III of FIG. 1.

DESCRIPTION OF THE PREFERRED EMBODIMENT

In the rack and pinion assembly shown in FIG. 1, a pinion 1 is rotatably mounted on two sets of bearings shown generally at 2 in a pinion housing 3. One of the bearings 2 is in the form of a ball race and the other comprises a socket and spigot arrangement which is the subject of the Adams and Goldsmith U.S. patent application Ser. No. 839,882, filed of even date herewith.

The pinion 1 is adapted to be rotatably driven through a shaft 4 and engages with a rack 5 in a side face 6c of a rack bar 6 so that rotation of the pin 1 effects movement of the rack bar 6 in a longitudinal direction through the pinion housing 3.

The rack bar 6 is of trapezoidal or keystone-wedge shape in lateral section and is provided with longitudinally extending and opposed side walls 6a and 6b which converge from the side face 6c of the rack bar towards the opposite side face of the rack bar. The sidewalls 6a and 6b converage at an angle $a$ to provide a rack bar which is effectively in the shape of a wedge in transverse section (see FIG. 2).

Mounted in the pinion housing 3 and located on the side of the rack bar 6 remote from the rack 5 is a carrier member 7 of semi-rigid plastics material such as polyurethane. The carrier member 7 is provided with a longitudinally extending recess 8 which is partly defined by opposed surfaces 8a and 8b respectively located on side parts 9 and 10 of the carrier member. The surfaces 8a and 8b converge towards the bottom of the recess 8 and form an included angle $a'$ when the carrier member 7 is in an unstressed condition. External flanges 11 and 12 are respectively provided at the free ends of the side parts 9 and 10. The carrier member 7 has a base part 13 in a recess 13a in which is carried a bearing plate 14. The carrier member 7 is located within a chamber 7a in the pinion housing 3 so that the base part 13 is retained by the housing 3 from transverse movement but can exhibit sliding movement through the chamber towards and from the rack bar 6, i.e., the width of the chamber 7a is approximately equal to the dimension $d$ (see FIG. 2).

The carrier member is slidable through the chamber 7a so that the side parts 9 and 10 straddle the rack bar and the recess 8 moves into engagement with the side faces 6a and 6b of the rack bar 6. The carrier 7 is adjustably movable through the housing 3 by a screw 15 which abuts the bearing plate 14.

The included angle $a'$ is slightly smaller than the included angle $a$ and consequently as the side parts 9 and 10 are moved onto the rack bar 6 (i.e., as the rack bar is moved deeper into the recess) the surfaces 6a, 6b are effectively an interference fit with the surfaces 8a, 8b respectively. The unstressed dimension $d'$ between the flanges 11 and 12 is slightly less than the dimension $d$ and as the rack bar 6 is moved further into engagement with the recess 8, the side parts 9 and 10 are transversely displaced outwardly from each other and away from the rack 5 into engagement with the housing 3. By adjustment of the screw 15 the displacement of the side parts 9 and 10 can be varied as required to so compress the flanges 11 and 12 between the rack bar and pinion housing so that the rack bar is restrained against lateral or transverse movement relative to the pinion 1 while the rack bar can slide longitudinally through the recess 8. In addition to supporting the rack bar against lateral movement it will be apparent that the resilient flanges 11 and 12 provide self-adjustment to slight movements of the rack bar 6 and further provide damping against shock forces which may be applied to the rack bar.

I claim as my invention:

1. A rack and pinion assembly having a housing rotatably mounting a pinion and receiving a rack bar therethrough with a rack in meshed engagement with the pinion, a one-piece carrier member in the housing on the side of the rack bar remote from the rack, said carrier having a longitudinally extending recess slidably supporting the rack bar in partly straddling relation, means for shifting the carrier member in the housing to move the rack bar deeper into the recess, and said carrier member having sidewalls expanded by the rack bar into compressed relation between the rack bar and housing providing support for the rack bar against transverse movement in the general direction of the pinion axis.

2. The rack and pinion assembly of claim 1 wherein the carrier is a resilient plastic block with diverging sidewalls expanded by the rack bar into engagement with the pinion housing.

3. A rack and pinion assembly which comprises a pinion housing rotatably supporting a pinion therein and receiving a rack bar therethrough normal to the pinion axis, a chamber in said housing underlying said rack bar in alignment with the toothed portion of the pinion, a one-piece plastic carrier member slidably in said chamber and having a pair of longitudinally extending and opposed sidewalls providing a tapered recess therebetween receiving said rack bar therethrough, out-turned flanges on the free ends of said sidewalls engageable with the chamber walls in which the carrier is mounted, and means for forcing the carrier member against the rack bar to seat the rack bar deeper into said recess and to spread said sidewalls for forcing the flanges against the chamber walls whereby the rack bar will be slidably supported in the recess with an interference fit against the carrier member, and the carrier member will be compressed between the rack bar and chamber walls to prevent lateral displacement of the rack bar.

4. A carrier support for the mounting in the housing of a rack and pinion assembly which comprises a one-piece molded plastic block having a base fitting the housing in slidable relation and diverging side arms defining therebetween a wedge-shaped rack-receiving recess, said side arms being deflectable by the rack bar as the block is moved against the rack bar, and out-turned flanges on said side arms for engaging the pinion housing to compress the arms between the rack bar and housing.

5. In a rack and pinion assembly including a housing rotatably mounting a pinion and receiving a rack bar therethrough, a shiftable, one-piece plastic rack bar carrier in the housing having a wedge-shaped recess for receiving the rack bar, said rack bar having a wedge-shaped cross-section with an included wedge angle greater than the wedge angle of the carrier recess and effective to expand the sidewalls of the recess, and an adjustment screw accessible from outside of the housing acting on the carrier to force the rack bar deeper into the recess to maintain an interference bearing fit therewith and to expand the sidewalls of the recess into compressed relation between the rack bar and housing.

References Cited
UNITED STATES PATENTS 3,352,170  11/1967  Adams _____ 74—498X

FOREIGN PATENTS 976,661  12/1964  Great Britain _____ 74—498

MILTON KAUFMAN, Primary Examiner

U.S. Cl. X.R.

74—409, 422

UNITED STATES PATENT OFFICE
CERTIFICATE OF CORRECTION

Patent No. 3,572,158          Dated   March 23, 1971

Inventor(s)   FREDERICK JOHN ADAMS

It is certified that error appears in the above-identified patent and that said Letters Patent are hereby corrected as shown below:

Column 1, line 40, after "bars" cancel "or" and insert --of--;
Column 2, line 15, cancel "actal" and insert --acetal--;
Column 2, line 44, cancel "bar";
Column 3, line 73, cancel "," (comma) and insert --.-- (period).

Signed and sealed this 21st day of December 1971.

(SEAL)
Attest:

EDWARD M. FLETCHER, JR.          ROBERT GOTTSCHALK
Attesting Officer                Acting Commissioner of Patent